(12) United States Patent
Bowman

(10) Patent No.: US 6,371,298 B1
(45) Date of Patent: Apr. 16, 2002

(54) ADJUSTABLE CUTTING BOARD APPARATUS

(76) Inventor: Blain C. Bowman, 11138 164 N. Ct., Jupiter, FL (US) 33478

( * ) Notice: Subject to any disclaimer, the term of this patent is extended or adjusted under 35 U.S.C. 154(b) by 0 days.

(21) Appl. No.: 09/797,614

(22) Filed: Mar. 5, 2001

(51) Int. Cl.[7] ................................................ B26D 7/00
(52) U.S. Cl. .................... 206/542; 269/289 R; 269/901
(58) Field of Search .......................... 206/315.11, 541, 206/542, 579; 269/289 R, 309, 901; 312/205, 257.1

(56) References Cited

U.S. PATENT DOCUMENTS

| 1,403,883 A | 1/1922 | Woods |
| 3,926,419 A | 12/1975 | Kenny |
| 4,833,999 A | 5/1989 | Rhoades |
| 5,098,338 A | 3/1992 | Jensen |
| 5,382,009 A | 1/1995 | Mertz et al. |
| D357,847 S | 5/1995 | Hoffman |
| 5,605,056 A | * 2/1997 | Brown et al. .................. 43/55 |
| 5,636,469 A | * 6/1997 | Pizzolo et al. .................. 43/55 |
| 5,924,352 A | * 7/1999 | Lothe ........................ 269/309 |

* cited by examiner

Primary Examiner—Jim Foster

(57) ABSTRACT

An adjustable cutting board apparatus for eliminating the user from having to stoop over to use the cutting board. The adjustable cutting board apparatus includes a carrying case having an open front, an open top, and also having side, back, and bottom walls; and also includes a drawer being movably disposed in the carrying case through the open front; and further includes an adjustable cutting board assembly including a plurality of telescoping support members being disposed in the carrying case through said open top, and also including a cutting board being disposed upon the telescoping support members; and also includes fastening members for locking the cutting board to the carrying case.

10 Claims, 4 Drawing Sheets

ADJUSTABLE CUTTING BOARD APPARATUS

BACKGROUND OF THE INVENTION

1. Field of the Invention

The present invention relates to a height adjustable cutting board and more particularly pertains to a new adjustable cutting board apparatus for eliminating the user from having to stoop over to use the cutting board.

2. Description of the Prior Art

The use of a height adjustable cutting board is known in the prior art. More specifically, a height adjustable cutting board heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,833,999; U.S. Pat. No. 5,382,009; U.S. Pat. No. 1,403,883; U.S. Pat. No. 3,926,419; U.S. Pat. No. 5,098,338; and U.S. Pat. No. Des. 357,847.

While these devices fulfill their respective, particular objectives and requirements, the aforementioned patents do not disclose a new adjustable cutting board apparatus. The inventive device includes a carrying case having an open front, an open top, and also having side, back, and bottom walls; and also includes a drawer being movably disposed in the carrying case through the open front; and further includes an adjustable cutting board assembly including a plurality of telescoping support members being disposed in the carrying case through said open top, and also including a cutting board being disposed upon the telescoping support members; and also includes fastening members for locking the cutting board to the carrying case.

In these respects, the adjustable cutting board apparatus according to the present invention substantially departs from the conventional concepts and designs of the prior art, and in so doing provides an apparatus primarily developed for the purpose of eliminating the user from having to stoop over to use the cutting board.

SUMMARY OF THE INVENTION

In view of the foregoing disadvantages inherent in the known types of height adjustable cutting board now present in the prior art, the present invention provides a new adjustable cutting board apparatus construction wherein the same can be utilized for eliminating the user from having to stoop over to use the cutting board.

The general purpose of the present invention, which will be described subsequently in greater detail, is to provide a new adjustable cutting board apparatus which has many of the advantages of the height adjustable cutting board mentioned heretofore and many novel features that result in a new adjustable cutting board apparatus which is not anticipated, rendered obvious, suggested, or even implied by any of the prior art height adjustable cutting board, either alone or in any combination thereof.

To attain this, the present invention generally comprises a carrying case having an open front, an open top, and also having side, back, and bottom walls; and also includes a drawer being movably disposed in the carrying case through the open front; and further includes an adjustable cutting board assembly including a plurality of telescoping support members being disposed in the carrying case through said open top, and also including a cutting board being disposed upon the telescoping support members; and also includes fastening members for locking the cutting board to the carrying case.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new adjustable cutting board apparatus which has many of the advantages of the height adjustable cutting board mentioned heretofore and many novel features that result in a new adjustable cutting board apparatus which is not anticipated, rendered obvious, suggested, or even implied by any of the prior art height adjustable cutting board, either alone or in any combination thereof.

It is another object of the present invention to provide a new adjustable cutting board apparatus which may be easily and efficiently manufactured and marketed.

It is a further object of the present invention to provide a new adjustable cutting board apparatus which is of a durable and reliable construction.

An even further object of the present invention is to provide a new adjustable cutting board apparatus which is susceptible of a low cost of manufacture with regard to both materials and labor, and which accordingly is then susceptible of low prices of sale to the consuming public, thereby making such adjustable cutting board apparatus economically available to the buying public.

Still yet another object of the present invention is to provide a new adjustable cutting board apparatus which provides in the apparatuses and methods of the prior art some of the advantages thereof, while simultaneously overcoming some of the disadvantages normally associated therewith.

Still another object of the present invention is to provide a new adjustable cutting board apparatus for eliminating the user from having to stoop over to use the cutting board.

Yet another object of the present invention is to provide a new adjustable cutting board apparatus which includes a carrying case having an open front, an open top, and also having side, back, and bottom walls; and also includes a drawer being movably disposed in the carrying case through the open front; and further includes an adjustable cutting board assembly including a plurality of telescoping support members being disposed in the carrying case through said open top, and also including a cutting board being disposed upon the telescoping support members; and also includes fastening members for locking the cutting board to the carrying case.

Still yet another object of the present invention is to provide a new adjustable cutting board apparatus that is easy and convenient to set up and adjust.

Even still another object of the present invention is to provide a new adjustable cutting board apparatus that can be easily carried as needed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
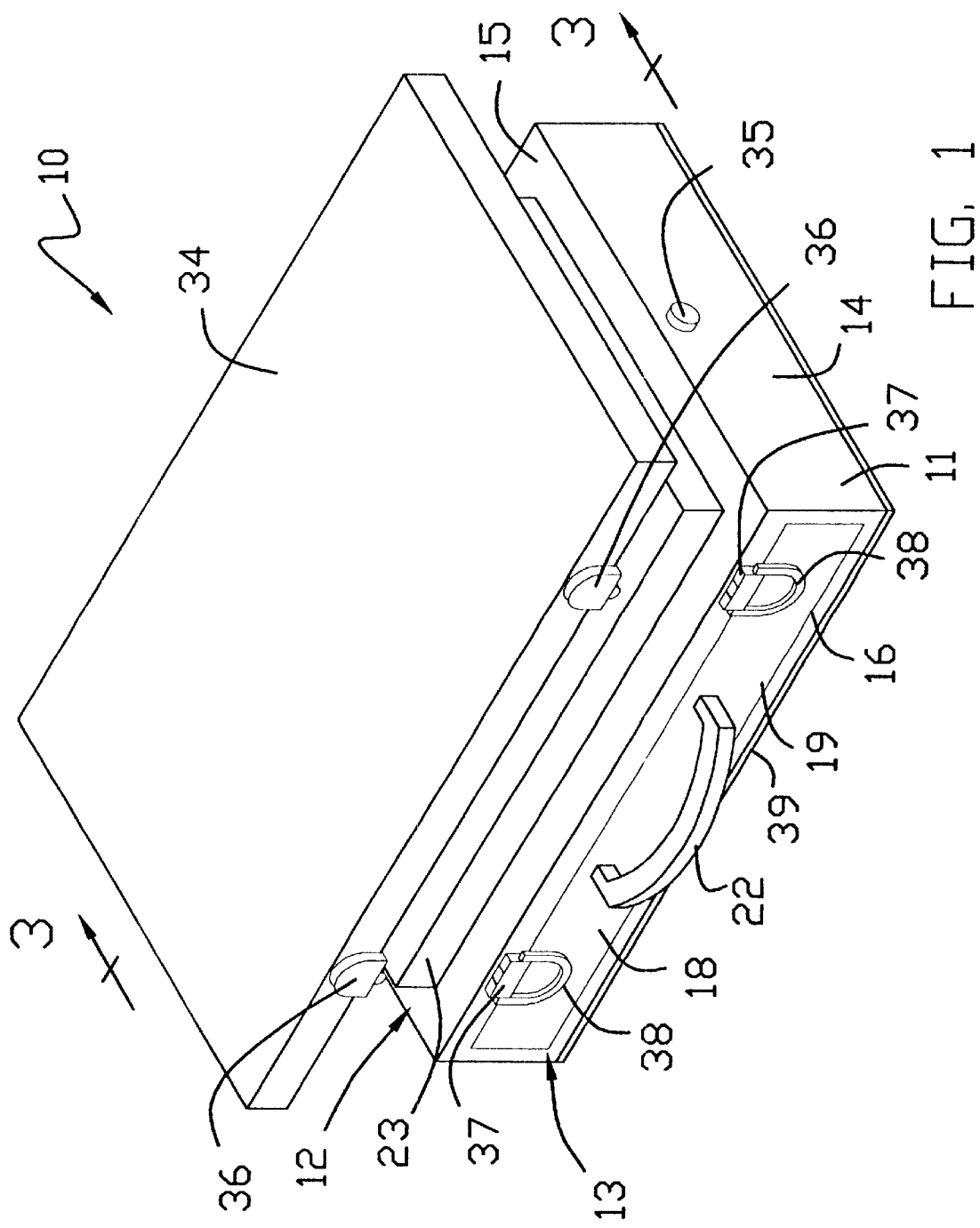
FIG. 1 is a perspective view of a new adjustable cutting board apparatus according to the present invention.
Figure 2:
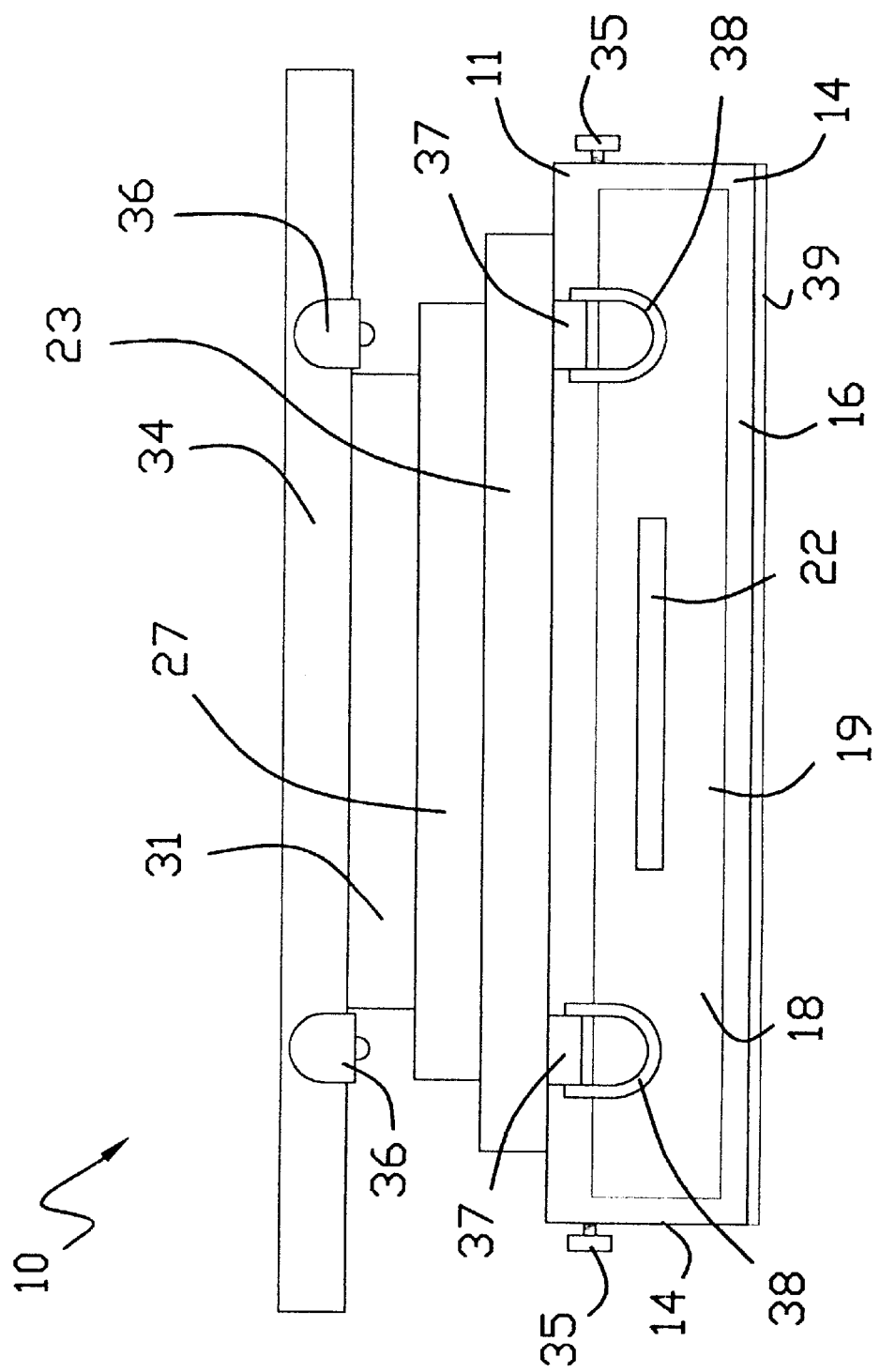
FIG. 2 is a front elevational view of the present invention.
Figure 3:
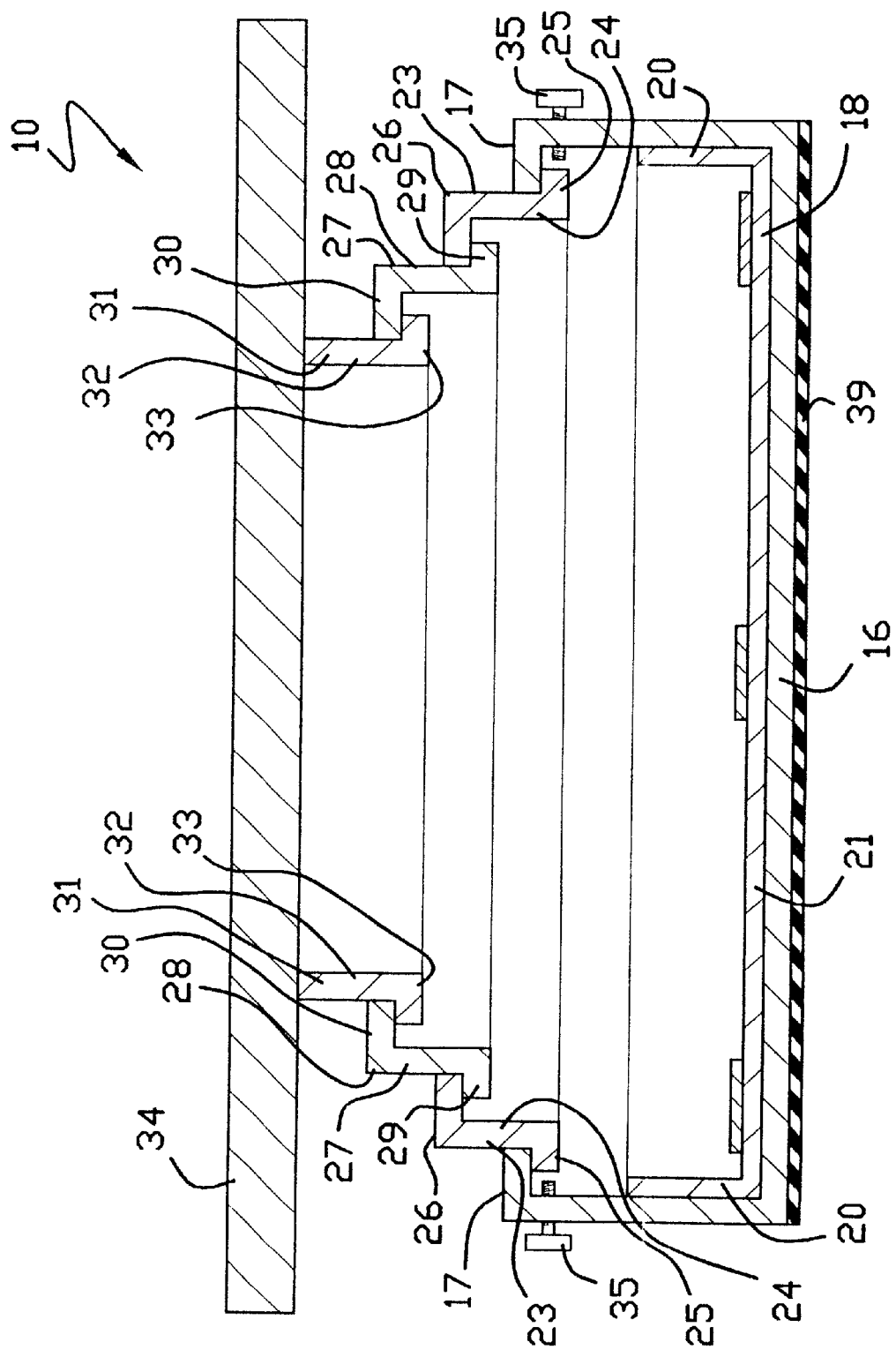
FIG. 3 is a cross-sectional view of the present invention shown in an extended position.
Figure 4:
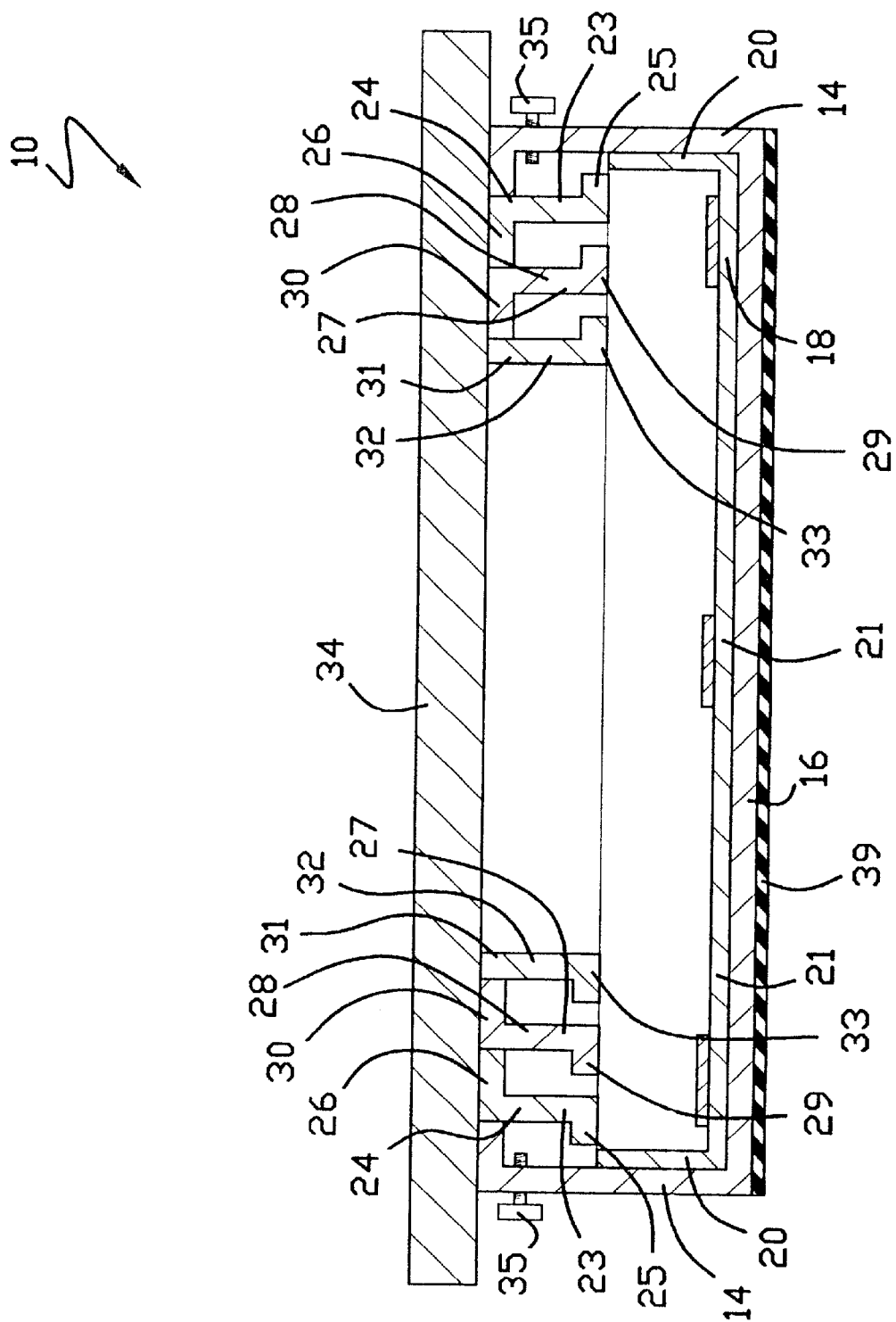
FIG. 4 is a cross-sectional view of the present invention shown in a collapsed position.

With reference now to the drawings, and in particular to FIGS. 1 through 4 thereof, a new adjustable cutting board apparatus embodying the principles and concepts of the present invention and generally designated by the reference numeral 10 will be described.

As best illustrated in FIGS. 1 through 4, the adjustable cutting board apparatus 10 generally comprises a carrying case 11 having an open front 13, an open top 12 and also having side, back, and bottom walls 14–16. The carrying case 11 also includes a rim 17 being inwardly disposed along a top of the side walls 14 thereof and being extended inwardly of the open top 12. A non-slip material 39 is securely and conventionally attached to an exterior of the bottom wall 16 of the carrying case 11 to prevent the carrying case 11 from slipping upon a tabletop surface.

A drawer 18 is movably disposed in the carrying case 11 through the open front 13. The drawer 18 includes a front wall 19, side walls 20, a bottom wall 21, and a handle member 22 being securely and conventionally attached to an exterior of the front wall 19.

An adjustable cutting board assembly includes a plurality of telescoping support members 23,27,31 being disposed in the carrying case 11 through the open top 12, and also includes a cutting board 34 being disposed upon the telescoping support members 23,27,31. The telescoping support members 23,27,31 include a base support member 23 having a side wall structure 24, and also having a flange 25 extending outwardly from and along a bottom of the side wall structure 24 and being in contactable relationship with the inwardly-disposed rim 17 of the carrying case 11, and further having an inwardly-disposed rim 26 extending along a top of the side wall structure 24. The base support member 23 is extendable through the open top 12 of the carrying case 11. The telescoping support members 23,27,31 also include an intermediate support member 27 having a side wall structure 28, and also having a flange 29 extending outwardly from and along a bottom of the side wall structure 28 and being in contactable relationship with the inwardly-disposed rim 26 of the base support member 23, and further having an inwardly-disposed rim 30 extending along a top of the side wall structure 28. The intermediate support member 27 has an area smaller than that of the base support member 23 and is movably disposed in and out of the base support member 23. The telescoping support members 23,27,31 also include an upper support member 31 having a side wall structure 32, and also having a flange 33 extending outwardly from and along a bottom of the side wall structure 32 and being in contactable relationship with the inwardly-disposed rim 30 of the intermediate support member 27. The upper support member 31 has an area smaller than that of the intermediate support member 27 and is movably disposed in and out of the intermediate support member 27. The cutting board 34 is securely and conventionally mounted upon a top of the upper support member 31 and has an area which is generally equal to that of the carrying case 11. The cutting board 34 is adapted to close the open top 12 of the carrying case 11. The adjustable cutting board assembly further includes adjustment knobs 35 being threaded through the side walls 14 of the carrying case 11 and through the side wall structures 24,28,32 of the support members 23,27,31 to secure the support members 23,27,31 at outwardly extended and elevated positions.

Fastening members 36–38 for locking the cutting board 34 to the carrying case 11 include latch members 36, catch members 37, and fastening rings 38. The fastening members 36–38 are securely and conventionally attached to the drawer 18 and to the cutting board 34.

In use, the user positions the carrying case 11 upon a tabletop surface and raises the cutting board 34 relative to the carrying case 11 and secures the cutting board 34 at a selected height with the adjustment knobs 35 to allow the user to use the cutting board 34 without having to stoop over. Once finished, the user simply loosens the adjustment knobs 35 and lowers the cutting board 34 upon the carrying case 11 and secures the cutting board 34 to the carrying case 11 using the fastening members 36–38.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An adjustable cutting board apparatus comprising:
    a carrying case having an open front, an open top, and also having side, back, and bottom walls;
    a drawer being movably disposed in said carrying case through said open front;
    an adjustable cutting board assembly including a plurality of telescoping support members being disposed in said carrying case through said open top, and also including a cutting board being disposed upon said telescoping support members; and
    fastening members for locking said cutting board to said carrying case.

2. An adjustable cutting board apparatus as described in claim 1, wherein said drawer includes a front wall, side walls, bottom wall, and a handle member being securely attached to an exterior of said front wall.

3. An adjustable cutting board apparatus as described in claim 2, wherein said fastening members include latch members, catch members, and fastening rings, said fastening members being securely attached to said drawer and to said cutting board.

4. An adjustable cutting board apparatus as described in claim 1, wherein said carrying case also includes a rim being inwardly disposed along a top of said side walls thereof and being extended inwardly of said open top, and also includes a non-slip material being securely and conventionally attached to an exterior of said bottom wall of the carrying case to prevent said carrying case from slipping upon a tabletop surface.

5. An adjustable cutting board apparatus as described in claim 4, wherein said telescoping support members include a base support member having a side wall structure, and also having a flange extending outwardly from and along a bottom of said side wall structure and being in contactable relationship with said inwardly-disposed rim of said carrying case, and further having an inwardly-disposed rim extending along a top of said side wall structure, said base support member being extendable through said open top of said carrying case.

6. An adjustable cutting board apparatus as described in claim 5, wherein said telescoping support members also include an intermediate support member having a side wall structure, and also having a flange extending outwardly from and along a bottom of said side wall structure and being in contactable relationship with said inwardly-disposed rim of said base support member, and further having an inwardly-disposed rim extending along a top of said side wall structure, said intermediate support member having an area smaller than that of said base support member and being movably disposed in and from said base support member.

7. An adjustable cutting board apparatus as described in claim 6, wherein said telescoping support members also include an upper support member having a side wall structure, and also having a flange extending outwardly from and along a bottom of said side wall structure and being in contactable relationship with said inwardly-disposed rim of said intermediate support member, said upper support member having an area smaller than that of said intermediate support member and being movably disposed in and from said intermediate support member.

8. An adjustable cutting board apparatus as described in claim 7, wherein said cutting board is securely mounted upon a top of said upper support member and has an area which is generally equal to that of said carrying case, said cutting board being adapted to close said open top of said carrying case.

9. An adjustable cutting board apparatus as described in claim 8, wherein said adjustable cutting board assembly further include adjustment knobs being threaded through said side walls of said carrying case and through said side wall structures of said support members to secure said support members at outwardly extended and elevated positions.

10. An adjustable cutting board apparatus comprising:
    a carrying case having an open front, an open top, and also having side, back, and bottom walls, said carrying case also including a rim being inwardly disposed along a top of said side walls thereof and being extended inwardly of said open top, and also including a non-slip material being securely and conventionally attached to an exterior of said bottom wall of the carrying case to prevent said carrying case from slipping upon a tabletop surface;
    a drawer being movably disposed in said carrying case through said open front, said drawer including a front wall, side walls, bottom wall, and a handle member being securely attached to an exterior of said front wall;
    an adjustable cutting board assembly including a plurality of telescoping support members being disposed in said carrying case through said open top, and also including a cutting board being disposed upon said telescoping support members, said telescoping support members including a base support member having a side wall structure, and also having a flange extending outwardly from and along a bottom of said side wall structure and being in contactable relationship with said inwardly-disposed rim of said carrying case, and further having an inwardly-disposed rim extending along a top of said side wall structure, said base support member being extendable through said open top of said carrying case, said telescoping support members also including an intermediate support member having a side wall structure, and also having a flange extending outwardly from and along a bottom of said side wall structure and being in contactable relationship with said inwardly-disposed rim of said base support member, and further having an inwardly-disposed rim extending along a top of said side wall structure, said intermediate support member having an area smaller than that of said base support member and being movably disposed in and from said base support member, said telescoping support members also including an upper support member having a side wall structure, and also having a flange extending outwardly from and along a bottom of said side wall structure and being in contactable relationship with said inwardly-disposed rim of said intermediate support member, said upper support member having an area smaller than that of said intermediate support member and being movably disposed in and from said intermediate support member, said cutting board being securely mounted upon a top of said upper support member and having an area which is generally equal to that of said carrying case, said cutting board being adapted to close said open top of said carrying case, said adjustable cutting board assembly further including adjustment knobs being threaded through said side walls of said carrying case and through said side wall structures of said support members to secure said support members at outwardly extended and elevated positions; and fastening members for locking said cutting board to said carrying case, said fastening members including latch members, catch members, and fastening rings, said fastening members being securely attached to said drawer and to said cutting board.

* * * * *